(12) United States Patent
Tachauer et al.

(10) Patent No.: US 6,180,205 B1
(45) Date of Patent: Jan. 30, 2001

(54) TOUCH FASTENERS HAVING PORTIONS WITH DIFFERENT PROPERTIES AND METHODS OF MAKING SAME

(75) Inventors: Ernesto S. Tachauer, Bedford; Brian J. VanBenschoten, Rochester, both of NH (US)

(73) Assignee: Velcro Industries B.V., Curacao (NL)

( * ) Notice: Under 35 U.S.C. 154(b), the term of this patent shall be extended for 0 days.

(21) Appl. No.: 09/283,474

(22) Filed: Apr. 1, 1999

(51) Int. Cl.⁷ .................................................. A44B 18/00
(52) U.S. Cl. ............................. 428/100; 428/99; 24/442; 24/452
(58) Field of Search .................... 428/99, 100; 24/452, 24/442

(56) References Cited

U.S. PATENT DOCUMENTS

| | | |
|---|---|---|
| 3,629,032 | 12/1971 | Erb . |
| 3,752,619 | 8/1973 | Menzin et al. . |
| 3,801,245 | 4/1974 | Erb . |
| 4,104,428 | 8/1978 | Liu et al. . |
| 4,230,752 | 10/1980 | Benedyk . |
| 4,264,661 | 4/1981 | Brandolf . |
| 4,361,606 | 11/1982 | Butler et al. . |
| 4,461,738 | 7/1984 | Russell . |
| 4,872,243 | 10/1989 | Fischer . |
| 5,196,266 | 3/1993 | Lu et al. . |
| 5,229,138 | 7/1993 | Carotti . |
| 5,316,849 | 5/1994 | Lu et al. . |
| 5,441,687 | 8/1995 | Murasaki et al. . |

FOREIGN PATENT DOCUMENTS 0 723 406 B1    7/1996   (EP) .

*Primary Examiner*—Alexander S. Thomas
(74) *Attorney, Agent, or Firm*—Fish & Richardson P.C.

(57) ABSTRACT

Touch fasteners with different portions having different material properties, and methods and apparatus for making such a product. In one embodiment, the fastener includes a cross-linkable polymer, and a first portion of the fastener is cross-linked and a second portion of the fastener is not cross-linked or is cross-linked to a degree less than said first portion. In another embodiment, the fastener is made in a continuous process on a rotating mold roll having a plurality of fastener element mold cavities extending into the mold roll from its outer circumferential surface. The method includes applying a first polymer to the mold roll and forcing some of the first polymer into the mold cavities, with some of the first polymer remaining on the surface of the mold roll in the form of a film having thickness; with a doctoring blade, removing at least some of the first polymer remaining on the surface of the mold roll to at least reduce the thickness of the film of the first polymer on the mold roll surface (in some cases, substantially all of the polymer on the mold roll surface is removed); and applying a second polymer to the mold roll, the second polymer being compatible with, and adhering to, the first polymer.

17 Claims, 4 Drawing Sheets

TOUCH FASTENERS HAVING PORTIONS WITH DIFFERENT PROPERTIES AND METHODS OF MAKING SAME

BACKGROUND OF THE INVENTION

The present invention relates to fasteners, in particular to hook and loop type fasteners.

Arrays of molded male fastener elements, e.g., hooks, are often formed integrally with a sheet-form base, to provide a sheet-form fastener component. This component can then be engaged with a similar component of female fastener elements to form a "hook and loop" fastener. It is desirable that the fastener elements have good strength and toughness, so as to provide strong engagement during repeated use of the fastener. It is, on the other hand, desirable that the sheet-form base be relatively soft and flexible, e.g., to allow the base to flex with a fabric article to which it is attached and to prevent the edges of the sheet-form component from causing discomfort to a wearer.

SUMMARY OF THE INVENTION

The invention features an improved, continuously formed touch fastener product with different portions having different material properties, and methods and apparatus for making such a product.

The invention can provide a fastener having both relatively hard, durable regions and relatively softer, more flexible regions. In one aspect of the invention, such a fastener product is produced by forming, from a cross-linkable polymer, a plurality of molded fastener elements integral with a sheet-form base, and selectively cross-linking regions of the polymer to form the hard, durable regions. The regions that are not cross-linked remain relatively soft and flexible. In another aspect of the invention, such a fastener is produced by forming the hard, durable regions from a first polymer, and joining to the first polymer a second polymer having properties different from the first polymer to form the relatively softer, more flexible regions.

In one aspect of the invention, the invention features a fastener including a sheet-form base member, and, extending outwardly from, and integral with, the base member, a plurality of molded fastener elements. At least a portion of the fastener includes a cross-linkable polymer, and a first portion of the fastener is cross-linked and a second portion of the fastener is not cross-linked or is cross-linked to a degree less than the first portion.

Preferred embodiments include one or more of the following features. At least some of the fastener elements are cross-linked. The base member is not cross-linked. The fastener elements include a cross-linkable polymer and the base member includes a non-cross-linkable polymer, or, alternatively, both the fastener elements and the base include a cross-linkable polymer. The base member has a flexural modulus of less than about 80,000 pounds per square inch (psi), more preferably 10,000 to 60,000 psi, and the fastener elements have a flexural modulus of greater than 80,000 psi, more preferably 80,000 to 120,000 psi. The fastener elements have a flexural modulus that is at least 25% higher than that of the base member, more preferably at least 50% higher. The base has a thickness of less than 0.015 inch, more preferably about 0.001 to 0.005 inch. The cross-linkable polymer is selected from the group consisting of polyvinyl chloride (PVC), polyvinylidene fluoride (PVDF), poly(ethylene terephthalate) (PET), polyacrylates, polyamides, thermoplastic elastomers, and mixtures thereof. At least some of the fastener elements are male fastener elements, e.g., hooks. The hooks are cross-linked.

According to another aspect, the invention features a method of making a fastener including (a) forming a fastener comprising a sheet-form base member and a plurality of molded fastener elements extending outwardly from and integral with said sheet-form base member, at least a portion of the fastener being formed from a cross-linkable polymer; and (b) cross-linking the cross-linkable polymer in a manner so that a first portion of the fastener is cross-linked while a second portion of the fastener remains non-cross-linked or is cross-linked to a lesser degree than the first portion.

Preferred embodiments include one or more of the following features. Step (b) is performed using electron beam radiation. The cross-linkable polymer is a thermoplastic elastomer that is capable of increasing at least 25% in flexural modulus upon substantially complete cross-linking. The fastener is formed entirely of a thermoplastic elastomer. The fastener elements are hooks. The hooks are cross-linked during step (b). At least a portion of the base is not cross-linked during step (b).

In yet another aspect, the invention features a method of making a fastener including (a) forming a fastener comprising a sheet-form base member and a plurality of molded fastener elements extending outwardly from and integral with said sheet-form base member, by forming a first portion of the fastener from a cross-linkable polymer, and joining the first portion to a second portion of the fastener that is formed from a second polymer; and (b) at least partially cross-linking the first cross-linkable polymer. The invention further features fasteners made by this method.

According to another aspect of the invention, the invention features a method of making a continuous fastener product having an array of fastener elements extending from a sheet-form base. The method includes: (a) providing a mold roll defining a plurality of fastener element mold cavities extending into the mold roll from the outer circumferential surface of the mold roll; (b) applying a first polymer to a surface of the mold roll and forcing some of the first polymer into the mold cavities, with some of the first polymer remaining on the surface of the mold roll in the form of a film having thickness; (c) with a doctoring blade, removing at least some of the first polymer remaining on the surface of the mold roll after step (b) from the surface of the mold roll to at least reduce the thickness of the film of the first polymer on the mold roll surface; (d) applying a second polymer to the mold roll, the second polymer being compatible with the first polymer and adhering thereto; (e) solidifying the first polymer in the mold cavities to form fastener elements; and (f) removing the fastener elements from the mold cavities.

Preferred implementations of the method include one or more of the following features. In step (c), substantially all of the first polymer that remains on the mold roll after step (b) is removed by the doctoring blade. The first polymer is applied by an extruder. The second polymer is applied by an extruder. The first polymer is cross-linkable and the method includes cross-linking the first polymer after removal from the mold roll. The first polymer is relatively harder than the second polymer. The second polymer is more elastic, when solidified, than the first polymer. The method includes, after step (d), bonding a third polymer to the second polymer.

According to another aspect of the invention, the invention features a method of making a continuous fastener product having an array of fastener elements extending from a sheet-form base. The method includes: (a) providing a mold roll defining a plurality of fastener element mold cavities extending into the mold roll from the outer circumferential surface of the mold roll; (b) applying a first polymer to the surface of the mold roll and forcing some of the first polymer into the mold cavities, with some of the first polymer remaining on the surface of the mold roll in the form of a film having thickness; (c) with a doctoring blade, removing at least some of the first polymer remaining on the surface of the mold roll after step (b) from the surface of the mold roll to at least reduce the thickness of the film of the first polymer on the mold roll surface; (d) applying a tie layer to the mold roll, the tie layer being compatible with and adhering to the first polymer; and (e) applying a second polymer to the tie layer.

Preferred implementations of the method include one or more of the following features. The first and second polymers are different materials. The tie layer comprises an adhesive. The tie layer comprises a polymer.

The present invention can provide a fastener having both relatively hard, durable regions and relatively softer, more flexible regions. The inventor has found that such a fastener can be provided by forming, from a cross-linkable polymer, a plurality of molded fastener elements integral with a sheet-form base, and selectively cross-linking regions of the polymer to form the hard, durable regions. The regions that are not cross-linked remain relatively soft and flexible. Alternatively, such a fastener can be provided by forming the hard, durable regions from a first polymer, and joining to the first polymer a second polymer having properties different from the first polymer to form the relatively softer, more flexible regions.

Advantageously, the hard and soft regions can be positioned as desired to suit a particular application. Thus, in certain cases where it is desired that the fastener elements be relatively stiff and durable, while the base be soft and flexible, the fastener elements are cross-linked to a desired degree while the base is not cross-linked or is cross-linked to a lesser degree than the cross-linking of the fastener elements. Alternatively, the fastener elements can be formed of a first, relatively hard polymer, and the base from a second, relatively soft polymer.

Certain aspects of the invention also enable the formation of fastener products having relatively stretchable (i.e., rubbery or elastic) bases and relatively stiff or rigid fastener elements. Such products are useful, for instance, in diaper closures, where the elasticity of the base can help to maintain an engagement shear force on the fastener elements.

Other features and advantages of the invention will be apparent from the drawings, the following description, and the claims.

DESCRIPTION OF THE EMBODIMENTS

Figure 1:
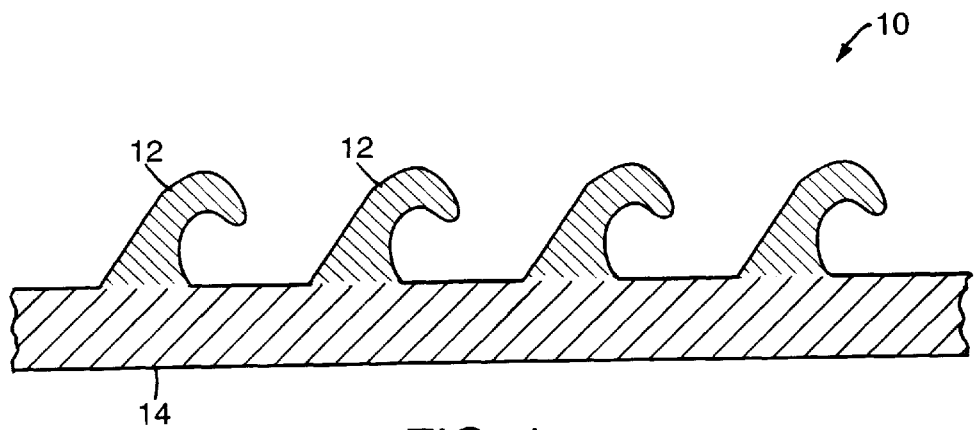
FIG. 1 is a side cross-sectional view of a fastener according to one embodiment of the invention.

Referring to FIG. 1, fastener 10 includes a plurality of hooks 12 that are integral with, and extend from, a sheet-form base 14. The hooks and base may be formed from the same cross-linkable polymer or, alternatively, may be formed of different polymers. If they are formed from different polymers the hook-forming polymer is cross-linkable; the other polymer can be either cross-linkable or non-cross-linkable. Hooks 12 are cross-linked, while the base 14 is not cross-linked or is cross-linked to a lesser degree than the hooks. As a result, the hooks are tough and durable, while the base is soft and flexible.

The base should be sufficiently strong to withstand its intended use without tearing or other damage, while also being relatively thin and flexible, to give good "drape". Preferably, the base is less than 0.005 inch thick, more preferably from about 0.001 to 0.003 inch thick.

The hooks have a significantly higher flexural modulus than the base, preferably at least 25% higher and more preferably at least 50% higher.

Figure 2:
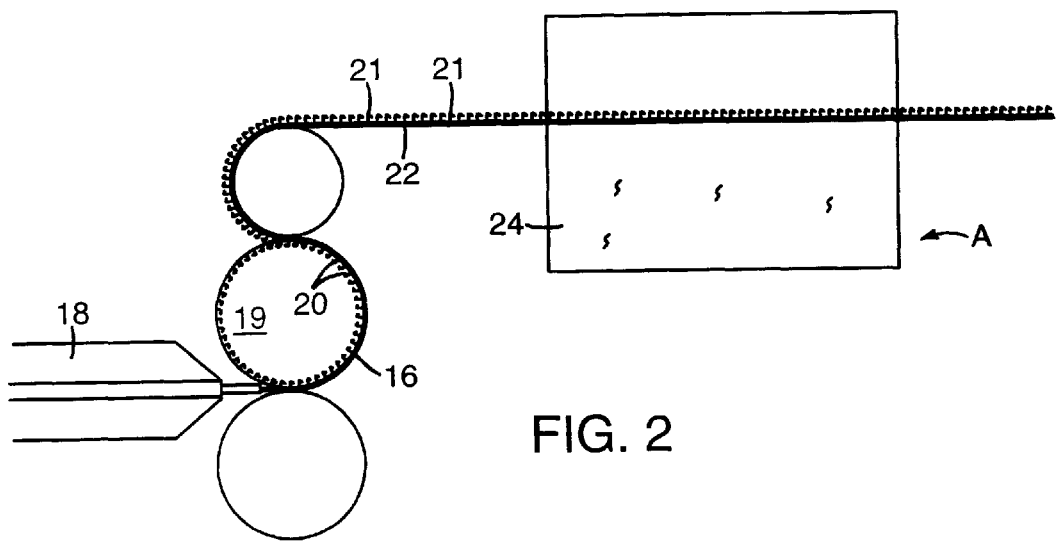
FIG. 2 is a diagrammatic view of a process for making the fastener of FIG. 1.

FIG. 2 illustrates a suitable process for forming the fastener shown in FIG. 1. As shown in FIG. 2, a cross-linkable polymer 16 is extruded by extruder 18 onto a roll 19 having hook forming cavities 20 (e.g., as described in U.S. Pat. No. 4,872,243, the disclosure of which is incorporated herein), forming hooks 21 extending from a base 22. It is noted that this step is shown merely as an example, and can be replaced by any desired method of molding hooks on a base, e.g., the processes described in U.S. Pat. Nos. 4,894,060, 4,794,028 and 5,441,687, the disclosures of which are incorporated by reference herein.

Figure 2A:
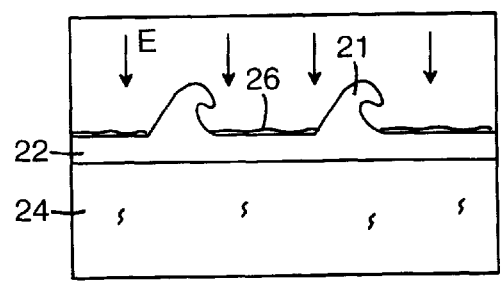
FIG. 2A is an enlarged diagrammatic view of the portion of the process of FIG. 2 shown in box A.

The resulting hook-carrying base 22 then passes to a cross-linking station A, shown in further detail in FIG. 2A. At cross-linking station A, the base 22 passes through a bath of an inert shielding fluid 24, e.g., a solution of salts of heavy metals such as barium, or a cooled bath of liquid mercury, while the hooks 21 remain above the surface 26 of the fluid. While the base 22 is in the bath, the hooks are exposed to radiation (arrows E), e.g., electron beam radiation, causing the hooks to cross-link or partially cross-link. If it is desired that the base of the hooks remain flexible, the hooks can be partially submerged in the bath along with the base.

Figure 3:
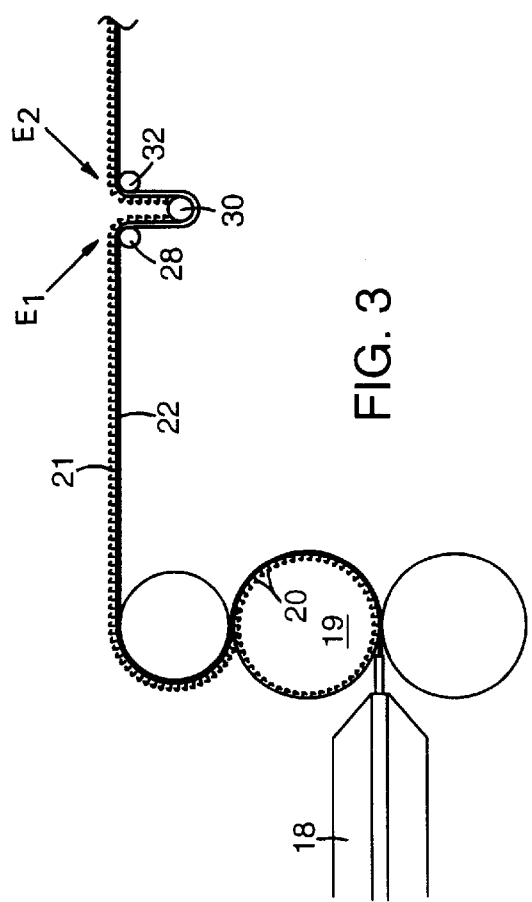
FIG. 3 is a diagrammatic view of an alternative process for making the fastener of FIG. 1.

An alternative process is shown in FIG. 3. In this process, the bath of shielding fluid is omitted, and instead the hook-carrying base 22 passes through a series of rolls 28, 30, 32. The arrangement of the rolls causes the base 22 to bend around rolls 28 and 32, forming bent areas. Electron beams E1, E2, that point in the machine direction (in the plane of the page, in FIG. 3), are then directed at the bent areas. Thus, the electron beams will cross-link the hooks without significantly affecting the base. If desired, more rolls can be provided downstream of roll 32, in a similar arrangement, to provide more bent areas at which radiation can be directed.

Polymers that are suitable for use in this embodiment of the invention are those that can be molded to form fastener elements and can subsequently be selectively cross-linked, as described above. Suitable polymers include polyvinyl chloride (PVC), polyvinylidene fluoride (PVDF), poly (ethylene terephthalate) (PET), polyacrylates, polyamides, thermoplastic elastomers, e.g., HYTREL elastomers and PEBAX elastomers, and mixtures thereof. Polyester-based thermoplastic elastomers, e.g., HYTREL elastomers, and polyether/polyamide-based thermoplastic elastomers, e.g., PEBAX elastomers, are preferred. Many of these polymers will require suitable cross-linking agents in order to cross-link when exposed to radiation. Suitable cross-linking agents are well known to those skilled in the art. Suitable polymers that contain electron beam cross-linking agents include thermoplastic elastomers available from Zylon Corp., Monsey, N.Y. 10952, under the trade name "ZYLON EBXL TPE". The cross-linkable polymer can also include additives such as fillers, stabilizers, accelerators, and the like, as is well known.

Cross-linking can be effected using various techniques, e.g., electron beam or ultraviolet radiation, heat, or any other desired technique suitable for the selected polymer. The cross-linking conditions are selected based on the polymer used and the properties desired.

In alternative embodiments, a first polymer is used to form the hooks and a second polymer is used to form the base. Thus, the hook-forming polymer can be cross-linkable and the base-forming polymer can be non-cross-linkable (or not cross-linkable under the conditions used to cross-link the hook-forming polymer), so that it is not necessary to "mask" the base during cross-linking of the hooks. Alternatively, the hook-forming polymer can be harder than the base-forming polymer, and both polymers can have the desired properties without cross-linking.

Figure 4:
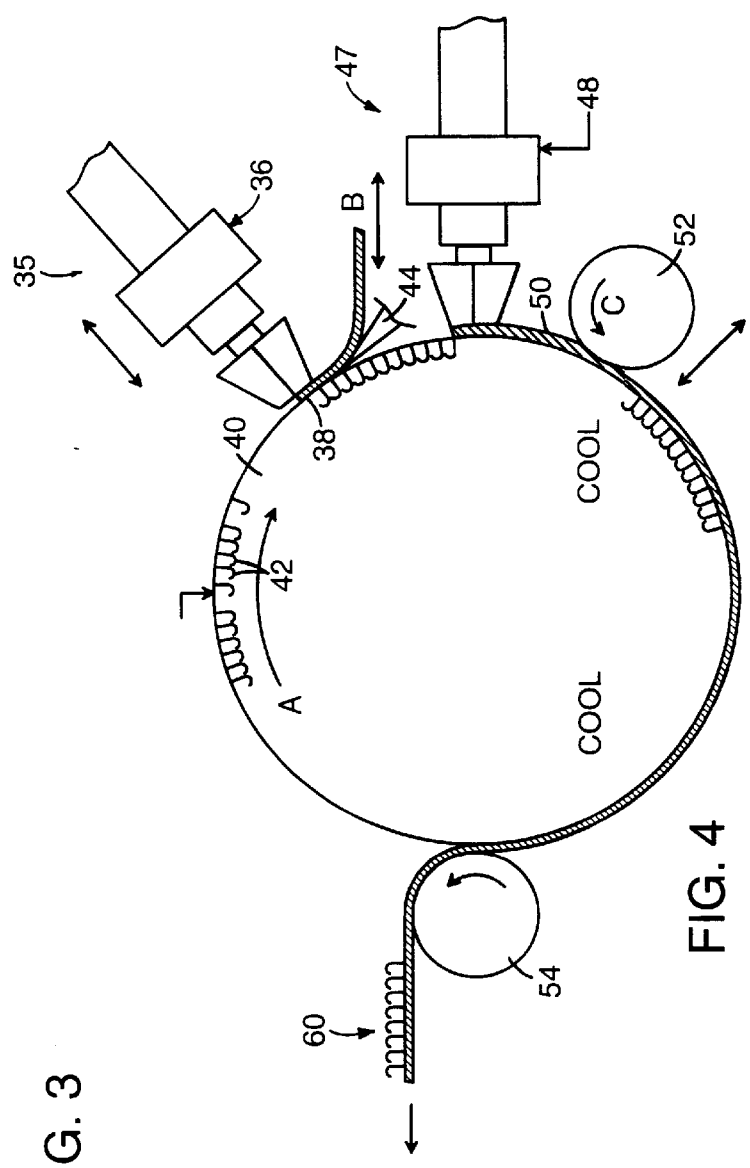
FIG. 4 is a diagrammatic view of a process for making fasteners according to an alternative embodiment of the invention.

A suitable process for forming such a two-polymer fastener is shown in FIG. 4. A first extruder 35 extrudes a first, hook-forming polymer 38 onto mold roll 40, forcing some of the polymer into hook-forming cavities 42 and leaving a layer of polymer on the surface of the mold roll. As mold roll 40 rotates in the direction of arrow A, doctoring blade 44 removes some or all of the polymer on the surface of the mold roll without disturbing the polymer in cavities 42. The removed polymer, which has been exposed to air while on the mold roll and may have begun to solidify, may be either discarded or returned to the hopper for remelting. The thickness of polymer left on the surface of the roll by the doctoring blade will depend, in part, on how close the blade is positioned to the surface of the mold roll (the position is adjustable in the direction indicated by arrow B). In some cases, the sharp, distal end of blade 44 rides against the mold roll, thereby literally scraping off essentially all of the polymer on the surface of the roll. In such cases it is recommended that the end of the blade be coated with a lubricious material to avoid damaging the surface of the mold roll. In other cases, the position of the blade is adjusted to leave a predetermined thickness of polymer on the roll, to become a part of the base of the product. In such cases, the doctoring blade effectively trims the polymer thickness rather than actually "scraping" against the surface of the roll. Next, a second extruder 47 extrudes a second, base-forming polymer 50 onto the surface of the mold roll (or onto any of polymer 38 left on the surface of the roll by blade 44). A gear pump 36, 48, is positioned at the outlet of each extruder, to accurately control the rate of polymer delivered to the mold roll. The final thickness of the base of the product is then adjusted by roll 52, rotating in the direction of arrow C, and the finished fastener product 60 is stripped from the mold roll 40 by passing it around exit roll 54.

For forming a fastener product having a relatively stretchable base and relatively stiff fastener elements, a urethane may be employed for the hook-forming polymer 38 and a rubber-filled polyethylene or polyester based thermoplastic may be employed for the base-forming polymer 50. An example of such a base-forming material is ARNITEL EM400, available from DSM.

Figure 5:
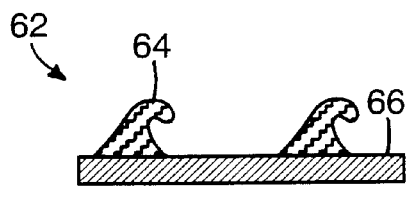
FIGS. 5–5D are cross-sectional side views of fasteners according to alternative embodiments of the invention.
Figure 5A:
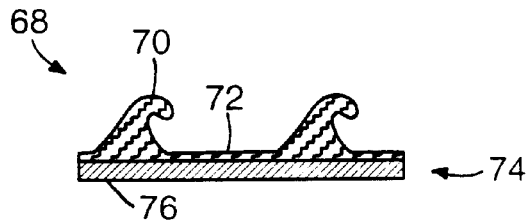
Figure 5B:
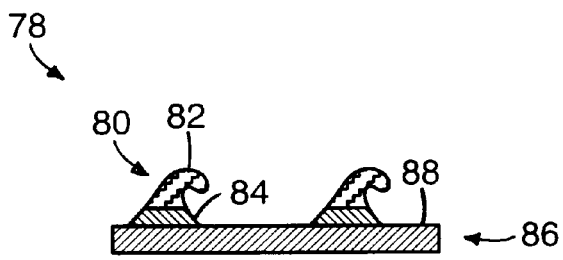
Figure 5C:
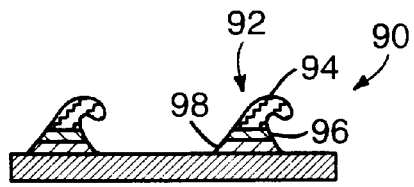
Figure 5D:
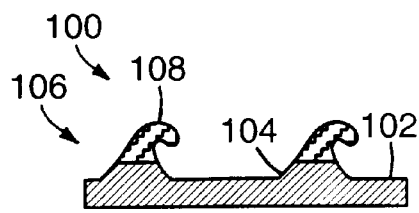

Examples of various fasteners that can be formed using the process shown in FIG. 4 (or modifications of this process) are shown in FIGS. 5–5D.

FIG. 5 shows a fastener 62, in which the hooks 64 are formed of a first polymer and the base 66 is formed of a second polymer. Using the process shown in FIG. 4, such a fastener can be formed by scraping substantially all of the first polymer off of the surface of the mold roll prior to applying the second polymer.

FIG. 5A shows a fastener 68, in which the hooks 70 and the upper portion 72 of the base 74 are formed of a first polymer, and the lower portion 76 of base 74 is formed of a second polymer. Using the process shown in FIG. 4, such a fastener can be formed by adjusting doctoring blade 46 away from the mold roll surface so that a thin layer of the first polymer remains on the mold roll surface when the second polymer is applied. When using a stiff first polymer and a flexible or stretchable second polymer, the layer of first polymer is preferably sufficiently thin, as determined by the positioning of the doctoring blade, to enable the rupture of the thin layer of first polymer upon the initial stretch of the second polymer layer, such as during the initial engagement of a diaper tab. Subsequently, the rigidity of the thin layer of the first polymer does not detract from the stretchability of the base of the fastener product.

FIG. 5B shows a fastener 78, in which the hooks 80 are formed of a first polymer 82 and a second polymer 84, and the base 86 is formed of a third polymer 88. To form this fastener, the process shown in FIG. 4 is modified so that the first extruder 35 applies an amount of the first polymer that only partially fills the mold cavities, and then another extruder (not shown in FIG. 4) applies the second hook-forming polymer to completely fill the cavities. The process then continues as shown in FIG. 4, with scraping and application of the base-forming polymer by extruder 47. If the two polymers 82, 84 are not compatible, or do not adhere well to each other, a thin tie layer of adhesive, or a third polymer that adheres well to both polymers 82 and 84, can be applied between polymers 82 and 84. This can be accomplished by replacing extruder 47 with a co-extrusion die, or by other known methods of applying tie layers.

FIG. 5C shows a fastener 90 in which the hooks 92 are formed of three different polymers 94, 96, 98. This fastener would be formed in a manner similar to that described below with reference to FIG. 5D, adding a further extruder to apply the third hook-forming polymer. This embodiment can provide combinations of properties difficult to obtain with only two polymers. Alternatively, the middle polymer 96 may be used as a "tie layer" to bond polymers 94 and 98 if, for example, these polymers are incompatible or do not adhere well to each other.

FIG. 5D shows a fastener 100 in which the base 102 and a lower portion 104 of hooks 106 are formed of a first polymer, and the upper portion 108 of the hooks is formed of a second polymer. This fastener would be formed by the process of FIG. 4, by only partially filling the molding cavities using extruder 35, and then completing the filling of the cavities with extruder 47.

Figure 6:
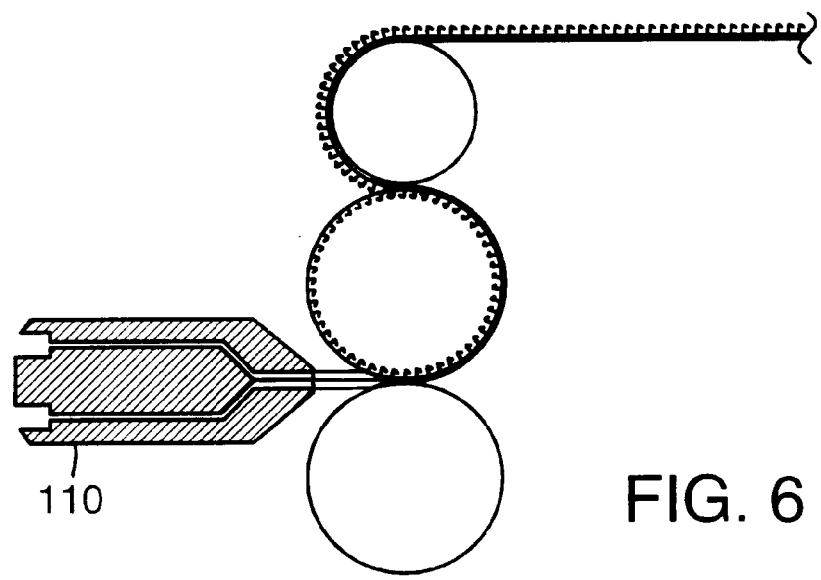
FIGS. 6 and 7 are diagrammatic views of alternative processes for making fasteners of the invention.
Figure 7:
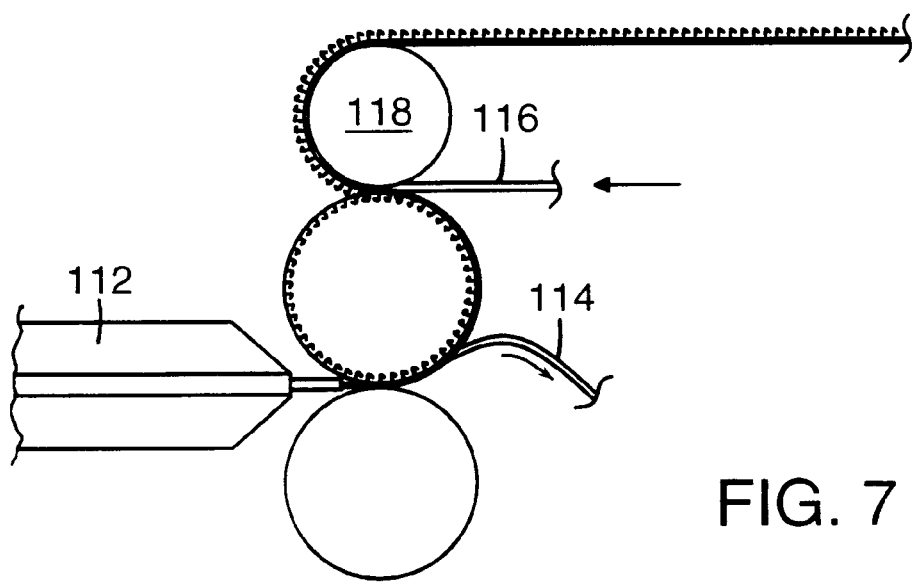

FIGS. 6 and 7 show alternative processes for forming a two-polymer fastener. In the process shown in FIG. 6, the first and second polymers are applied to the mold roll by a coextruder 110. In the process shown in FIG. 7, the hook-forming polymer is applied to the mold roll by an extruder 112, and most of the polymer is scraped from the surface of the mold roll by a doctoring blade 114, leaving a thin film of polymer, as described above with reference to FIG. 4. The base-forming polymer 116 is then laminated to the thin film of hook-forming polymer while the latter is still on the mold roll, such as in the nip between the mold roll and roll 118, as shown.

The hook-carrying base that is formed using any of the processes shown in FIGS. 4, 6 and 7 can be partially cross-linked, if one of the polymers (preferably the hook-forming polymer) is cross-linkable. If the other polymer is not cross-linkable, or not cross-linkable under the same conditions, it is not necessary to mask or shield that component. Thus, for example, an electron beam can be directed at the entire fastener (positioned so that it hits at least the portions to be cross-linked) at a station (not shown) that is downstream of the processes shown in FIGS. 4, 6 and 7. If both polymers have the desired properties for a given application without cross-linking, the hook-carrying base formed by the processes shown in FIGS. 4, 6 and 7 can be used "as-is", without a further cross-linking step.

Polymers that are suitable for use in the fasteners shown in FIGS. 5–5D include the above-described cross-linkable polymers, if cross-linking is used. If cross-linking is not used, suitable polymers for the relatively hard portions of the fastener include polypropylenes, e.g., PROFAX 7823 polymer, commercially available from Montell USA, Inc., and other relatively hard polymers such as PET and polyamides, e.g., polyamide 6/6 and polyamide 6. Preferably, the relatively hard polymer has a flexural modulus of at least 80,000, more preferably at least 120,000 psi. Suitable polymers for the relatively soft portions include vulcanized blends of polypropylene and EPDM, e.g., SANTOPRENE polymers, commercially available from Advanced Elastomer Systems, Inc., and other relatively soft polymers such as those commercially available under the trade names HYTREL and PEBAX. Preferably, the relatively soft polymer has a flexural modulus of greater than 80,000, more preferably about 10,000 to 60,000 psi. It is preferred that the two polymers be compatible, i.e., that they adhere to one another and that they be relatively inert with respect to each other (or, if they are reactive, that such reaction does not have a significant deleterious effect on the desired properties of the polymers). If they are incompatible, a tie layer can be used to join them, as discussed above.

Other embodiments are within the claims. For example, while FIG. 1 shows loop-engageable, hook-shaped fastener elements, the fastener elements may be of any desired shape (e.g., mushrooms, loops, multi-directional hooks, or spikes). The touch fastener can also include other raised structures such as veins, ridges, or rip-stopping formations, which would preferably be selectively cross-linked with the fastener elements.

Moreover, while the touch fastener shown in FIG. 1 includes a non-cross-linked base and cross-linked fastener elements, for other applications other regions of the fastener are cross-linked and non-cross-linked.

What is claimed is:

1. A touch fastener comprising:

sheet-form base portion; and extending outwardly from, and integral with, the base portion, a plurality of molded fastener elements;

wherein said fastener elements and said base portion comprise a cross-linkable polymer, and wherein a first portion of the fastener is more cross-linked than a second portion of the fastener.

2. The touch fastener of claim 1 wherein at least some of the fastener elements are cross-linked.

3. The touch fastener of claim 2 wherein said base portion is not cross-linked.

4. The touch fastener of claim 3 wherein said base portion has a flexural modulus of less than about 80,000 psi.

5. The touch fastener of claim 1 wherein said cross-linkable polymer comprises a thermoplastic elastomer.

6. The touch fastener of claim 1 formed in a continuous length.

7. The fastener of claim 1 wherein said fastener elements are hook-shaped.

8. The touch fastener of claim 7 wherein said hook-shaped fastener elements are cross-linked.

9. The touch fastener of claim 8 wherein said fastener elements have a flexural modulus of at least 80,000 psi.

10. A touch fastener comprising:

a sheet-form base portion; and extending outwardly from, and integral with, the base portion, a plurality of molded fastener elements selected from the group consisting of hook-shaped elements, mushrooms, loops, multi-directional hooks and spikes;

wherein the fastener comprises a cross-linkable polymer, and wherein a first portion of the fastener is more cross-linked than a second portion of the fastener.

11. The touch fastener of claim 10 wherein at least some of the fastener elements are cross-linked.

12. The touch fastener of claim 11 wherein said base portion is not cross-linked.

13. The touch fastener of claim 12 wherein said fastener elements comprise said cross-linkable polymer and said base portion comprises a non-cross-linkable polymer.

14. The touch fastener of claim 12 wherein said fastener elements and said base portion comprise said cross-linkable polymer.

15. The touch fastener of claim 12 wherein said base portion has a flexural modulus of less than about 80,000 psi.

16. The touch fastener of claim 10 wherein said cross-linkable polymer comprises a thermoplastic elastomer.

17. The touch fastener of claim 10 formed in a continuous length.

* * * * *